United States Patent
Hwang et al.

(10) Patent No.: US 11,063,458 B1
(45) Date of Patent: Jul. 13, 2021

(54) SYSTEMS AND METHODS FOR DYNAMIC PULSE CHARGING

(71) Applicant: Google LLC, Mountain View, CA (US)

(72) Inventors: Tai Sup Hwang, Santa Clara, CA (US); Ramesh C. Bhardwaj, Fremont, CA (US)

(73) Assignee: Google LLC, Mountain View, CA (US)

( * ) Notice: Subject to any disclaimer, the term of this patent is extended or adjusted under 35 U.S.C. 154(b) by 767 days.

(21) Appl. No.: 14/836,529

(22) Filed: Aug. 26, 2015

(51) Int. Cl.
*H02J 7/00* (2006.01)

(52) U.S. Cl.
CPC ............ *H02J 7/007* (2013.01); *H02J 7/0042* (2013.01); *H02J 7/0069* (2020.01)

(58) Field of Classification Search
CPC ......... H02J 7/007; H02J 7/0069; H02J 7/0042
USPC ........................................ 320/139, 141, 145
See application file for complete search history.

(56) References Cited

U.S. PATENT DOCUMENTS

| | | | |
|---|---|---|---|
| 5,694,023 A * | 12/1997 | Podrazhansky | H01M 10/44 320/129 |
| 5,889,385 A | 3/1999 | Podrazhansky et al. | |
| 6,366,056 B1 * | 4/2002 | Podrazhansky | H02J 7/0093 320/141 |
| 7,501,794 B2 * | 3/2009 | Felder | H02J 7/0086 320/128 |
| 8,093,866 B2 * | 1/2012 | Karoui | H01M 10/44 320/145 |
| 2005/0248314 A1 | 11/2005 | James | |
| 2012/0146589 A1 * | 6/2012 | Wick | H02J 7/0042 320/139 |
| 2013/0026976 A1 | 1/2013 | Lu | |
| 2015/0102779 A1 * | 4/2015 | Schumacher | H02J 7/0093 320/141 |

OTHER PUBLICATIONS

Van Dongen, R.C., "Li-Ion Charger for Implatable Devices, Selection of Optimal Charge Algorithm and Implementation," Master of Science Thesis, (2012).

* cited by examiner

*Primary Examiner* — Richard V Muralidar
(74) *Attorney, Agent, or Firm* — McDonnell Boehnen Hulbert & Berghoff LLP (57) ABSTRACT

This disclosure relates to systems and methods for charging a battery. An example embodiment may include a battery, a battery charger device and a controller. The controller is configured to cause the battery charger device to charge the battery with a plurality of pulses and rests. Each pulse includes a respective pulse duration and a respective pulse current. Each rest includes a respective rest duration. While in a first charge phase, the controller is configured to adjust at least one of: the respective pulse duration, the respective pulse current, or the respective rest duration based on at least one sample of a characteristic voltage of the battery. Subsequently, the controller is configured to initiate a second charging phase. The controller is further configured to cause the battery charger device to charge the battery according to a second charge waveform.

14 Claims, 10 Drawing Sheets

SYSTEMS AND METHODS FOR DYNAMIC PULSE CHARGING

BACKGROUND

A battery may store and supply energy through electrochemical reactions. While some batteries may only be used once, rechargeable batteries, also called secondary cells, may be charged and discharged many times over the lifetime of the battery.

Various types of electric systems and electronic devices are powered by such rechargeable batteries. For example, electric vehicles, power tools, smart phones, tablet devices, digital music players, keyboards, human interface devices, and laptop computers, among many other types of devices are powered by rechargeable batteries. With a growing abundance of such systems and devices, the demand for efficiently charging the batteries used to power these systems and devices continues to grow.

SUMMARY

In a first aspect, a system is provided. The system includes a battery, a battery charger device and a controller. The battery charger device is configured to controllably provide an electrical current to the battery. The controller is configured to while in a first charging phase, initially cause the battery charger device to charge the battery according to a first charge waveform. The first charge waveform includes a plurality of pulses and rests. Each pulse includes a respective pulse duration and a respective pulse current. Each rest includes a respective rest duration. While in the first charging phase, the controller is configured to periodically sample a characteristic voltage of the battery. The controller is further configured to while in the first charging phase, adjust at least one of: the respective pulse duration, the respective pulse current, or the respective rest duration based on at least one sample of the characteristic voltage of the battery. The controller is also configured to, subsequently, in response to the sampled characteristic voltage of the battery being greater than a threshold voltage, initiate a second charging phase. The controller is additionally configured to determine a second charge waveform and while in the second charging phase, cause the battery charger device to charge the battery according to the second charge waveform.

In a second aspect, a method is provided. The method includes causing a battery charger device to charge a battery with a characterization pulse. The method also includes while charging the battery with the characterization pulse, measuring a first characteristic voltage of the battery. The method further includes determining a first charge waveform based at least on the first characteristic voltage of the battery. The first charge waveform includes a plurality of pulses and rests. Each pulse includes a pulse duration and a pulse current and each rest includes a rest duration. The method yet further includes, while in a first charging phase, causing the battery charger device to charge the battery according to the first charge waveform. The method includes, while in the first charging phase, measuring a second characteristic voltage of the battery. The method also includes, subsequently, in response to the second characteristic voltage being greater than a threshold voltage, initiating a second charging phase. The method further includes determining a second charge waveform and, while in the second charging phase, causing the battery charger device to charge the battery according to the second charge waveform.

In a third aspect, a method is provided. The method includes, while in a first charging phase, causing a battery charger device to charge a battery according to a first charge waveform. The first charge waveform includes a plurality of pulses and rests. Each pulse includes a respective pulse duration and a respective pulse current. Each rest includes a respective rest duration. The method also includes, while in the first charging phase, periodically sampling a characteristic voltage of the battery. The method further includes, while in the first charging phase, adjusting the first charge waveform. Adjusting the first charge waveform includes adjusting at least one of: the respective pulse duration, the respective pulse current, or the respective rest duration based on at least one sample of the characteristic voltage of the battery. The method yet further includes, in response to the sampled characteristic voltage of the battery being greater than a threshold voltage, initiating a second charging phase. The method also includes determining a second charge waveform. The method additionally includes, while in the second charging phase, causing the battery charger device to charge the battery according to the second charge waveform.

Other aspects, embodiments, and implementations will become apparent to those of ordinary skill in the art by reading the following detailed description, with reference where appropriate to the accompanying drawings.

DETAILED DESCRIPTION

I. Overview

Rechargeable batteries may be charged using various methods, various systems, and according to various charging waveforms. For example, a battery charger device may be configured to charge the battery with a constant current until a voltage of the battery is greater than or equal to a first threshold voltage. In response to such a condition, the battery charger device may charge the battery with a constant voltage until a voltage of the battery is greater than or equal to a second threshold voltage. This charging waveform may be termed constant current, constant voltage (CC-CV).

In another example, the battery charger device may be configured to charge the battery with a predetermined pattern of voltage and/or current steps during at least a first charging phase, e.g. until a voltage of the battery is greater than or equal to a first threshold voltage. In such an example, the battery charger device may be further configured to charge the battery with a constant voltage until a voltage of the battery is greater than or equal to a second threshold voltage. This charging waveform may be termed multi-step constant current, constant voltage (multi-step CC-CV).

Methods and systems described herein may relate to a battery charger device and a controller configured to charge a battery. For example, the battery charger device may be configured to controllably provide an electrical current to the battery. In some embodiments, the battery charger device and the controller may be configured to provide a dynamic pulsed CC-CV charge waveform.

In an example embodiment, during a first charging phase (e.g. a "fast" charging phase), the controller may cause the battery charger device to charge the battery according to a first charge waveform. The first charge waveform may include a plurality of pulses and rests. The pulses may each include a respective pulse duration and a respective pulse current. In other words, the pulses may be a constant current pulse that charges the battery. The rests may each include a rest duration during which no current, or a reduced current, is provided to charge the battery. In some embodiments, the rests may allow increased or improved intercalation and/or diffusion of Li ions into the anode. These rests may additionally or alternatively allow voltage relaxation of the battery materials.

The battery charger device may be configured to provide to the controller information indicative of a battery type. For example, the controller may cause the battery charger device to sample a characteristic voltage of the battery. The controller may determine the battery type based on the voltage samples. The battery type may vary based on, for example, cell configuration, battery chemistry, charge capacity, charge/discharge rate, an operational age of the battery, etc.

Based at least on the determined battery type, the controller may establish and/or adjust a charge waveform. Subsequently, the battery charger device may charge the battery according to the charge waveform.

If the sampled battery voltage becomes greater than or equal to a threshold voltage, the controller may initiate a second charging phase. The second charging phase may include a "slow" charge phase. As such, the controller may determine a second charge waveform that includes a constant voltage charge waveform. The controller may then cause the battery charger device to charge the battery according to the constant voltage until such time that the battery is fully charged.

In some examples, the characteristic voltage (e.g. the sampled battery voltage values) may include a voltage difference. That is, the voltage difference may include a difference between a voltage of the battery during at least one pulse and a voltage of the battery during at least one rest of the charge waveform. Furthermore, in some embodiments, the controller is configured to adjust the respective rest duration throughout the first charging phase such that the voltage difference remains substantially similar (e.g. the same value).

The battery charging methods and systems described herein may be applied to a variety of battery chemistries and battery types. For example, the battery may be a thin film-type battery or a jelly roll-type battery. Furthermore, the anode may include graphite and the cathode may include lithium cobalt oxide (LiCoO$_2$ or LCO).

The charge waveforms described herein may include a variety of different pulse durations, pulse currents and rest durations. For example, the pulse duration may be 60 seconds, the pulse current may be 1.5×C, and the rest duration may be 10 seconds. C is equal to a charge rate necessary to charge a battery from an empty charge state to a full charge state in one hour.

II. Example Systems

Figure 1:
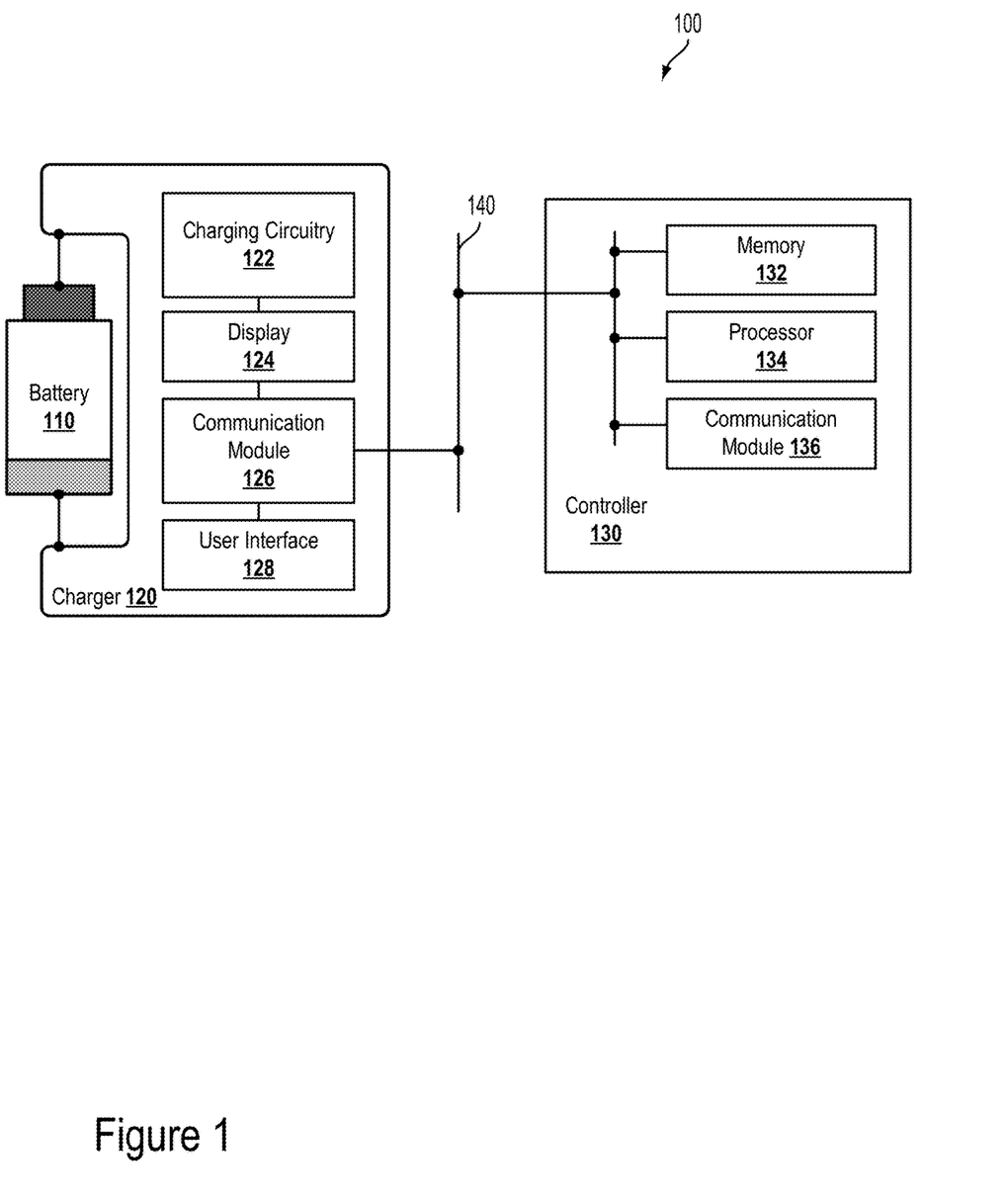
FIG. 1 is a block diagram of a system, according to an example embodiment.

FIG. 1 is a block diagram of a system 100, according to an example embodiment. System 100 may include a battery 110, a charger 120, and a controller 130. The battery 110 may include a secondary battery configured to be recharged via a charging current from charger 120. The battery 110 may include various materials including, but not limited to, lead-acid, nickel-cadmium, nickel metal hydride, lithium iron phosphate, lithium iron phosphate oxynitride (LIPON), lithium cobalt oxide (LiCoO$_2$), lithium-ion, lithium-ion polymer, or other materials. The battery 110 may include one or more electrochemical cells and may be optionally configured as a thin-film battery.

The battery 110 may be characterized as being of a particular battery type. In an example embodiment, the battery type may include a state of charge, a nominal cell voltage, an energy density, a battery material, a battery shape, a model number, a serial number, and/or other indicia that can help to differentiate between batteries.

Some electrical and/or physical characteristics of battery 110 may vary based on the state of charge (SOC) of battery 110. That is, based at least on the battery type and the SOC, battery 110 may exhibit particular electrical characteristics in response to charging and discharging. For example, in a battery charging scenario where battery 110 is a lithium ion battery with a relatively empty SOC (e.g. 10%), lithium ions may migrate from the positive to negative terminal more easily than if the battery 110 has a relatively full SOC (e.g. 90%). In other words, while charging battery 110, lithium ions may experience relatively high intercalation rates into the graphite anode while the SOC is low and the opposite while the SOC is high.

The charger 120 may include charging circuitry 122, a display 124, a communication module 126, and a user interface 128. The charging circuitry 122 may be controlled, at least in part, by controller 130 so as to provide an electrical charging current to the battery 110. Display 124 may include a light, e.g. one or more light emitting diodes, a liquid crystal display, and/or a display of a smartphone or another computing device. The display 124 may be configured to provide, among other information, data indicative of a current SOC of the battery 110, a current charging mode, and/or a current charging state or rate.

The charger 120 may be configured to provide a controllable constant DC current to the battery 110. Additionally or alternatively, the charger 120 may be configured to provide a pulsed DC current to the battery 110. Other ways to controllably provide electrical power using charger 120 are contemplated herein.

In an example embodiment, the charging circuitry 122 may include a constant current constant voltage (CC/CV) charger. The charging circuitry 122 may include an integrated circuit designed for battery charging, such as the National Semiconductor LM3658 or the Maxim MAX 1551. However, other embodiments may additionally or alternatively include different circuits.

Various methods, processes, and/or functions may be used to charge the battery 110. More specifically, an electric current (also referred to herein as a "pulsed current", a "constant current", and/or a "current") may be supplied to the battery 110 for purposes of charging the battery 110. In some embodiments, an effective method for charging a given battery may be a less effective method for charging a different battery, e.g. if the two batteries have different capacities or states of charge. For example, an electric current may be sufficient for charging a standard density battery (e.g., lithium or lithium-ion battery). However, this electric current may be insufficient for charging a battery with a high energy density. In such instances, charging the high energy density battery using this current may take substantially longer than it the time takes to charge the standard density battery. In such cases, the charging circuitry 122 and/or the controller 130 may be configured to detect the battery type, e.g. the SOC and/or the lithium ion diffusion rate, of the battery 110. Furthermore, the charging circuitry 122 and/or the controller 130 may be configured to adjust a charging waveform further based on the battery type of the battery 110.

The communication module 126 may be configured to provide a wireless communication link 140 with the controller 130, namely with a controller communication module 136. Communication link 140 may utilize one or more wired and/or wireless communication protocols. For example, the communication protocols may include Bluetooth, near-field communication (NFC), and/or another protocol.

The user interface 128 may include hardware and/or software operable to allow a user to select, modify, and/or control various aspects of the charger 120. In an example embodiment, the user interface 128 may include a switch. In another embodiment, the user interface 128 may include software and/or firmware, and possibly a device on which such software and/or firmware is executed. In such a scenario, the display 124 may include a touchscreen, and the user interface 128 may include a graphical user interface displayed on the display 124. The graphical user interface may provide graphical buttons, switches, sliders, or other interactive objects so as to allow a user of the system 100 to select and/or control the charger 120. In an example embodiment, a user may interact with a graphical user interface to select a preferred charge option from a set of charge options presented via the display 124. It is understood that many other ways to select a preferred charge option exist, which are all considered herein.

The controller 130 may include a memory 132 and a processor 134. As discussed above, the controller 130 may also include a communication module 136. The memory 132 may be configured to store information in various non-transitory formats. In an example embodiment, the memory 132 may store and/or include instructions that may be configured for execution by the processor 134 of controller 130. The processor 134 may include an integrated circuit, a central processing unit (CPU), an application-specific integrated circuit (ASIC), or another type of microprocessor associated with a computer.

The controller 130 may be configured to execute the instructions so as to carry out various operations. For example, the controller 130 may be configured to receive information indicative of a present state of charge of the battery 110. The information may include data about a current being provided by the battery 110, a temperature of the battery 110, a voltage of the battery 110, and/or a pressure of the battery 110. Other types of information indicative of a state of charge of a battery are contemplated herein.

The controller 130 may, while in a first charging phase, initially cause the charger 120 to charge the battery 110 with a plurality of pulses and rests. Each pulse may include a respective pulse duration and a respective pulse current, and each rest may include a respective rest duration. The first charging phase may include charging the battery 110 with a series of constant current pulses. Each pulse may have similar or different current amplitudes. The rests may be interspersed between the current pulses. The rests may include time periods during which substantially zero current flows through the battery 110. Alternatively or additionally, the rests may include delivery of a constant current to the battery 110 that is less than the constant current delivered to the battery 110 during the pulses.

The controller 130 may be further configured to, while in the first charging phase, periodically sample a characteristic voltage of the battery 110. The characteristic voltage may include, but need not be limited to, an open-circuit voltage of the battery 110. For example, the controller 130 may measure one or more samples of a voltage as measured between the positive terminal and the negative terminal of the battery 110.

It is understood that the characteristic voltage may include a voltage difference, which may relate to any combination of voltages or pulse and rest periods described herein. For instance, the voltage difference may include a difference between a terminal voltage of the battery during at least one pulse and a terminal voltage of the battery during at least one rest. Such a characteristic voltage may relate to a diffusion rate of lithium ions in the battery. However, other characteristic voltages that may indicate the battery state and/or condition are possible and contemplated herein.

The controller 130 may be configured to, while in the first charging phase, adjust at least one of: the respective pulse duration, the respective pulse current, or the respective rest duration based on a present state of charge of the battery and/or at least one sample of the characteristic voltage of the battery 110. In some example embodiments, the controller 130 may cause the charger 120 to provide a characterization pulse to the battery 110. Furthermore, the controller 130 may monitor, sense, and/or determine a peak voltage of the battery 110 during the characterization pulse. Based on the peak voltage, the controller 130 may adjust future pulse durations, pulse currents, and/or rest durations in the remainder of the first charging phase. For example, in response to a peak voltage being 50% of a predetermined threshold voltage, the controller 130 may adjust the pulse durations to be 1 minute each, the pulse currents to be 1.5 C, and the rest durations to be 10 seconds. Additionally or alternatively, in response to a peak voltage being 95% of a predetermined threshold voltage, the controller 130 may adjust the pulse durations to be 30 seconds each, the pulse currents to be 0.7 C, and the rest durations to be 30 seconds. It is understood that the pulse duration, pulse currents, and rest durations may vary based at least on a chemical composition of the battery 110 as well as other factors, such as the attributes of the charger 120 and the controller 130.

The controller 130 may be configured to, in response to the sampled characteristic voltage of the battery being greater than the threshold voltage, initiate a second charging phase. The second charging phase may include a constant voltage charging phase.

The controller 130 may determine a second charge waveform. For example, the second charge waveform may include a constant voltage based at least on the threshold voltage. In other words, the second charge waveform may include a predetermined constant voltage applied by the charger 120 to the battery 110. However, the second charge waveform may additionally or alternatively include pulsed charging waveforms. For example, a second charge waveform may include constant voltage pulses with rests interspersed between such pulses.

The controller 130 may be configured to, while in the second charging phase, cause the battery charger device to charge the battery according to the second charge waveform. That is, the controller 130 may adjust, switch, or otherwise control the charger 120 so as to apply the second charge waveform to the battery 110.

The controller 130 may be configured to adjust the respective rest duration such that the characteristic voltage and/or the voltage difference remains substantially similar from sample to sample while in at least the first charging phase. That is, the controller 130 may increase or decrease the rest duration of respective rests in an effort to maintain the characteristic voltage at a particular, predetermined voltage. For example, the controller 130 may gradually increase the rest duration to compensate for decreasing diffusion rates of lithium ions during the charging process. Other adjustments of the rest duration of respective rests are possible.

Furthermore, the controller 130 may be configured to adjust the respective pulse duration and/or the respective pulse current such that the characteristic voltage and/or the voltage difference remains substantially similar from sample to sample while in at least the first charging phase. That is, the controller 130 may increase or decrease the pulse duration and/or the pulse current of respective charge pulses during the first charging phase in an effort to maintain the characteristic voltage at a particular, predetermined voltage. For example, the controller 130 may gradually decrease the pulse duration to compensate for decreasing diffusion rates of lithium ions during the charging process. Alternatively or additionally, the controller 130 may gradually decrease the pulse current during the first charging phase. Other adjustments of the charge pulses are possible and contemplated herein.

The controller 130 may be configured to determine whether the charger 120 is electrically coupled to the battery 110. For example, the received information may include an indication that a voltage across two charging terminals of charger 120 is non-zero. In another embodiment, the received information may be indicative of a wired connection between the battery 110 and the charger. Other ways are possible to determine that the charger 120 is electrically connected to the battery 110. Furthermore, it should be understood that the charger 120 may be electrically coupled to the battery 110 via wired and/or wireless means. That is, the charger 120 may use an electromagnetic field to transfer energy to the battery 110, e.g. via inductive coupling. In an example embodiment, charger 120 may include an induction charger. In such a scenario, the charger 120 may include an induction coil operable to create an alternating electromagnetic field. Furthermore, battery 110 may be operable to receive power from the electromagnetic field and convert it into electrical current that may charge the battery 110.

The controller 130 may additionally be configured to receive an input indicative of a preferred charge option. As described above, the preferred charge option may be received via the user interface 128 and the display 124. The controller 130 may receive information indicative of the preferred charge option via the communication link 140. The preferred charge option may be selected from a plurality of charge options. The plurality of charge options may include a variety of predetermined pulse charging waveforms, e.g. involving charge pulses with various C-rates and various rest periods. In such a scenario, a user may choose an initial charge waveform, which may be subsequently adjusted automatically based on, for example, characteristic voltage samples.

The controller 130 may be yet further configured to determine a charging duration based on the battery type, the initial or present state of charge, a target state of charge, and the charge rate. In an example embodiment, the charging duration may be based on the charge waveform of the preferred charge option.

In an example embodiment, controller 130 may determine an "end point" or stopping point in the charging of the battery based on one of at least two different possible conditions. First, the controller 130 may cause charger 120 to provide electrical current to the battery 110 according to the charge waveform for a predetermined charging duration. Accordingly, the controller 130 may cause charger 120 to stop providing electrical current to the battery 110 upon charging for the predetermined charging duration. For example, the predetermined charging duration may be determined by a look-up table. Other charging durations (predetermined or otherwise) are possible. In another embodiment, the controller 130 may cause the charger 120 to stop charging upon the state of charge of the battery 110 reaching the target state of charge. That is, when the battery 110 is sufficiently charged, the charging may stop.

Although FIG. 1 suggests the charger 120 and the controller 130 as being physically apart, some embodiments may include the charger 120 and the controller 130 housed in the same body or frame. For example, the body or frame may include a smartphone, a computer, a tablet, a wall-wart, a battery charging assembly, or another type of device configured to charge a battery.

The battery 110 may be associated with, for example, a mobile computing device. In such a scenario, the controller 130 is further configured to display, via a display of the mobile computing device, a plurality of charge rates higher than the default charge rate. For example, the computing device may display information indicative of a current state of charge, a current charging process and/or a future charging process to a user of the computing device via the display. In some embodiments, the user may select a preferred charge option from a plurality of charge rates and/or charge processes.

In an example embodiment, the user may select the preferred charge option by interacting with a touchscreen, which may be implemented with display 124 and/or user interface 128. In an alternative embodiment, the charger 120 may include a multi-position switch. Each of the plurality of positions of the multi-position switch may be associated with a plurality of charge rates higher than the default charge rate. In such a scenario, a user may be able to select a preferred charge option by moving the multi-position switch. Other ways for a user to select a preferred charge option via hardware and/or software are contemplated.

In some embodiments, the controller 130 may determine a number of charging cycles completed by the battery 100. Furthermore, the controller 130 may adjust a charge waveform based on the determined number of charging cycles completed by the battery 110. As an example, a battery that has experienced several hundred charging cycles may have a lower lithium ion diffusion rate than a similar battery that has experienced ten charging cycles. In such a scenario, the battery that has experiences more charging cycles may be charged with shorter charge pulses, lower charge current, and/or longer rest durations.

In some embodiments, a charge waveform may be determined based on a capacity of the battery 110 (also referred to herein as the "discharge capacity" of the battery). In some instances, the capacity of the battery 110 may be described as a percentage. Further, in some instances, the capacity of the battery 110 may be described as percentage capacity of a maximum capacity, where the maximum capacity may be the highest capacity that a given battery may have throughout the life of the battery. For example, a battery with a 100% capacity may correspond to a new battery capable of charging to the maximum capacity of the battery. As such, the capacity of the battery 110 may degrade over time or with the number of charging cycles completed by the battery, amongst other possibilities.

In some embodiments, the capacity of the battery may decrease with the number of charging cycles completed by the battery. For example, a battery that has completed 1 to 100 charging cycles may have greater than or equal to approximately a 95% capacity of its maximum capacity. Further, a battery that has completed 101 to 300 charging cycles may have approximately an 85% to 95% capacity of its maximum capacity. Yet further, a battery that has completed greater than 300 charging cycles have a less than approximately an 85% capacity of its maximum capacity. In addition, an old battery may have approximately a 15% of its maximum capacity, among other possibilities.

In some embodiments, the capacity of the battery may decrease with time as the battery ages and/or towards the later stages of the battery's life. For example, a battery that has been used for 1 to 6 months may have greater than or equal to approximately a 95% capacity of its maximum capacity. Further, a battery that has been used for 6 to 12 months may have approximately an 85% to 95% capacity of its maximum capacity. Yet further, a battery that has been used for 12 to 24 months may have a less than approximately an 85% capacity of its maximum capacity. In addition, a battery that has been used for over 24 months may have approximately a 15% capacity of its maximum capacity.

In an example embodiment, the controller 130 may be further configured to determine a rest duration based on various factors such as the battery type and the pulse charge current. As described above, the rests may provide time for: 1. intercalation of ions into the electrode bulk, 2. mass transfer of ions within the battery material, and/or 3. diffusion of ions in the electrolyte bulk.

The controller 130 may be optionally configured to determine a full charge condition based on receiving information indicative of a state of charge of the battery 110 reaching the full charge capacity. That is, the controller 130 may receive information that may provide direct or indirect evidence of the battery's state of charge, which may include being equivalent to a full charge capacity. The information may include, but is not limited to, a cell/terminal voltage, a battery current, a temperature of the battery, a pressure of the battery, or any other information that may be used to determine a state of charge of a battery.

Optionally, an example embodiment includes the controller 130, in response to determining the full charge condition, causing the charger to stop providing electrical current to the battery. That is, subsequent to determining that the battery 110 has reached a full charge condition, the controller 130 may cause the charger 120 to stop providing charge to the battery 110.

Figure 2A:
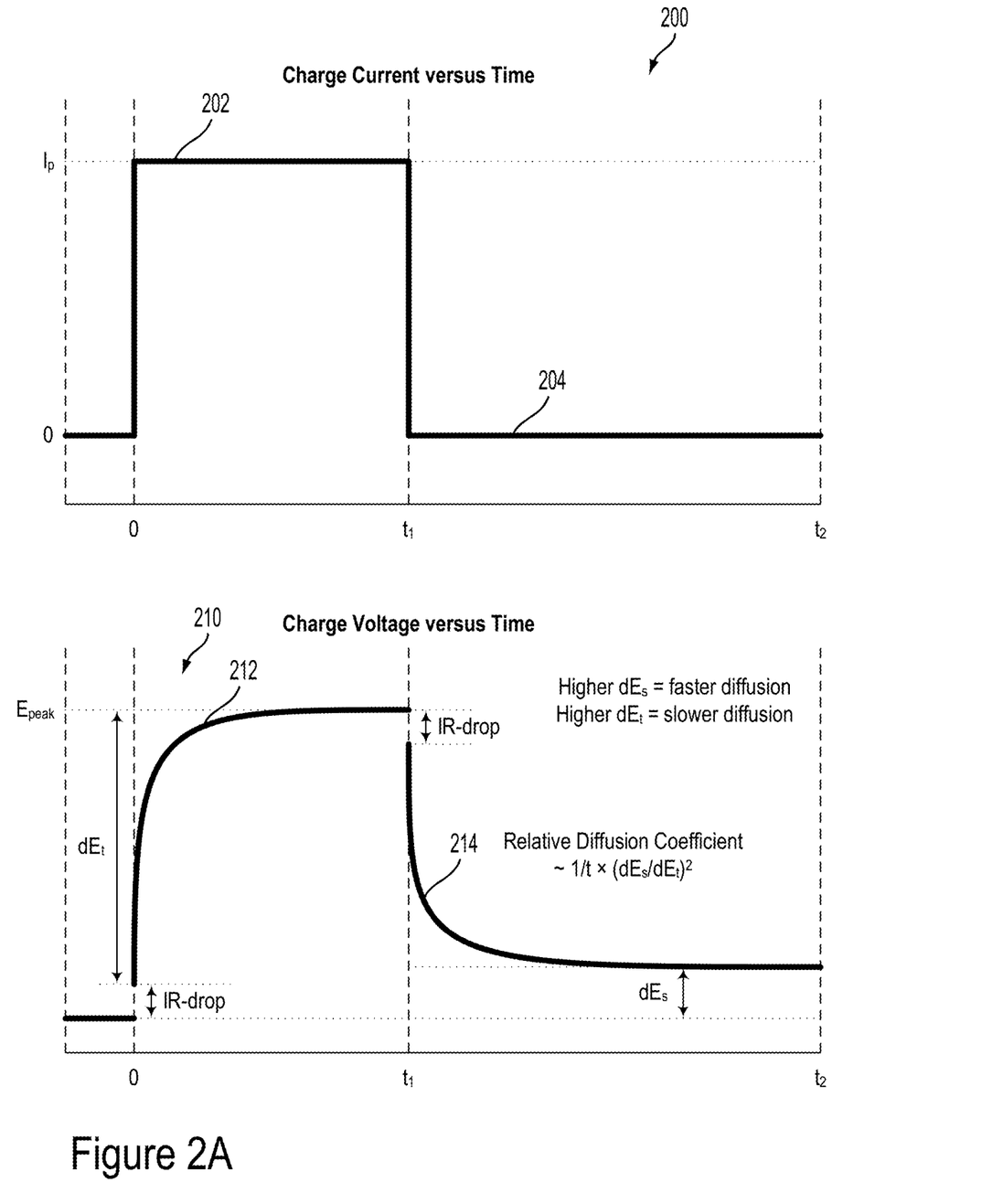
FIG. 2A illustrates a current and voltage waveform, according to an example embodiment.

FIG. 2A illustrates a current waveform 200 and voltage waveform 210, according to an example embodiment. The current waveform 200 may represent one charge pulse of a plurality of charge pulses that may be delivered to battery 100 by charger 120, as illustrated and described in relation to FIG. 1. The current waveform 200 may include a current pulse portion 202 and a rest portion 204. The current pulse portion 202 may include providing a pulse current, $I_p$, to the battery 110. The current pulse portion 202 may have a pulse duration of $t_1$. The rest portion 204 may include zero current being supplied to the battery 110. The rest portion 204 may have a rest duration of $t_{rest}=t_2-t_1$.

Voltage waveform 210 may include a voltage pulse portion 212 and a rest portion 214. The voltage pulse portion 212 may include a monotonically increasing voltage from a base voltage of zero or from a non-zero voltage based on an internal resistance of the battery 110 (IR-drop). The voltage pulse portion 212 may include a peak voltage ($E_{peak}$) and a voltage difference, $dE_t=E_{peak}-IR\text{-drop}$. The rest portion 214 may include a monotonically decreasing voltage from $E_{peak}$ or $E_{peak}-IR\text{-drop}$ to $dE_s$, where $dE_s$ is the lowest measured terminal voltage of the battery 110. The voltage waveform 210 may help determine a diffusion rate of lithium ions. For example, if charged with a plurality of such pulses, a higher $dE_s$ may indicate a higher rate of diffusion and a higher $dE_t$ may indicate a lower rate of diffusion.

Furthermore, a relative diffusion coefficient may be determined. The relative diffusion coefficient may indicate the relative diffusion rate of lithium during a charge cycle of a lithium ion battery. In some example embodiments, the relative diffusion coefficient may be represented by: $D_{Li+,\ rel}=1/t \times (dE_s/dE_t)^2$. Other ways to represent and/or determine the relative diffusion coefficient are contemplated herein.

Figure 2B:
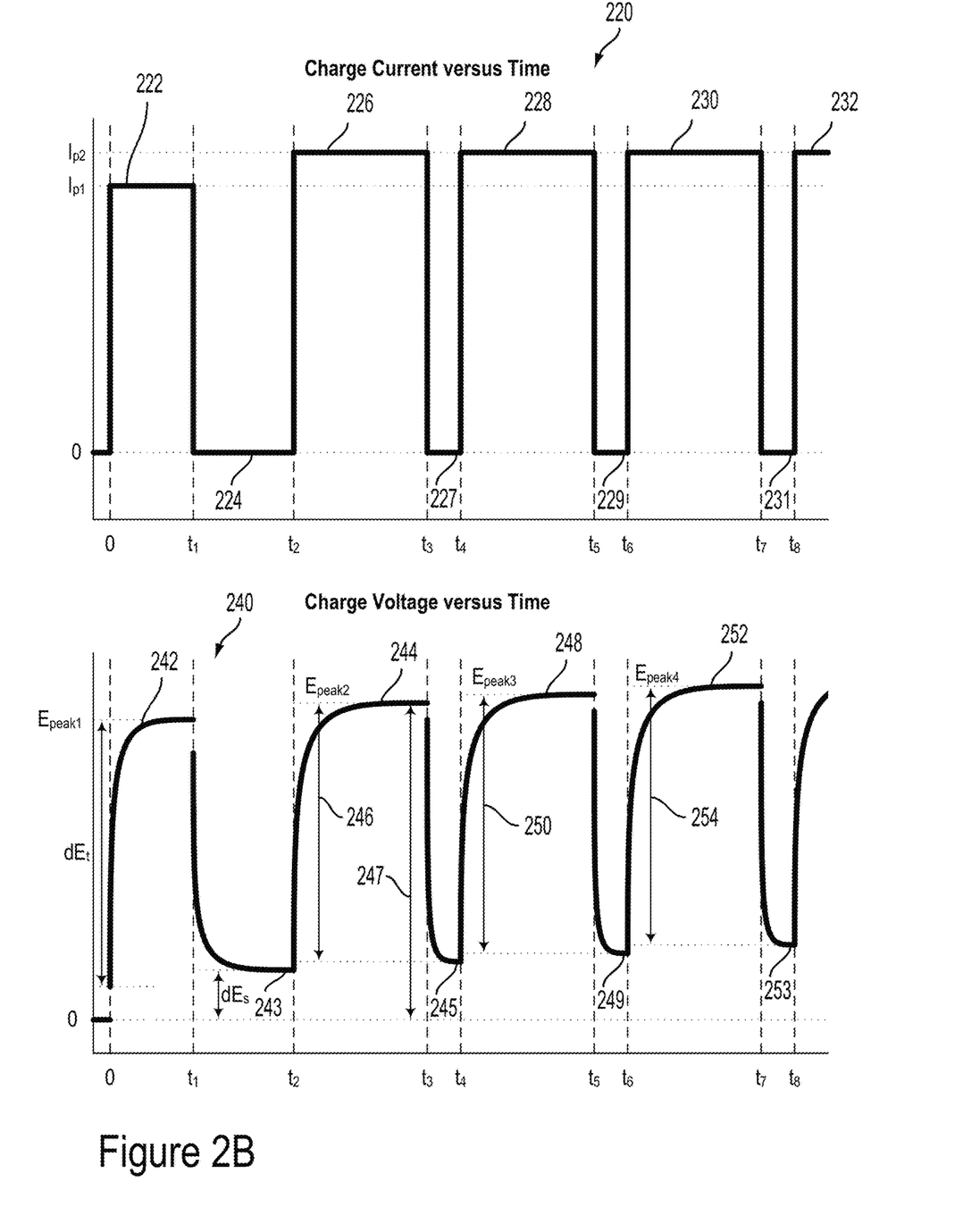
FIG. 2B illustrates a current and voltage waveform, according to an example embodiment.

FIG. 2B illustrates a current waveform 220 and a voltage waveform 240, according to an example embodiment. The current waveform 220 may include a plurality of current pulses 222, 226, 228, 230, and 232. Interspersed between the current pulses may be rests 224, 227, 229, and 231. The first current pulse 222 and first rest 224 may be a predetermined characterization pulse. For example, the controller 130 may cause the charger 120 to provide the battery 110 with a characterization pulse at the beginning of, or during, a charging process.

The characterization pulse may have a predetermined current (e.g. $I_{p1}$) and a predetermined pulse duration (e.g. $t_1$). Furthermore, the subsequent rest may have a predetermined rest duration (e.g. $t_2-t_1$). Subsequent pulses may include different a pulse duration (e.g. $t_3-t_2$), a different pulse current (e.g. $I_{p2}$), and/or a different rest duration (e.g. $t_4-t_3$).

Voltage waveform 240 may include a plurality of voltage pulses 242, 244, 248, and 252. Rests 243, 245, 249, and 253 may be interspersed between the voltage pulses.

The voltage across the terminals of battery 110 may be measured continuously or periodically while applying the characterization pulse so as to obtain information indicative of the battery condition or type and/or the diffusion rate of lithium ions in the battery 110. For example, similar to the example described in relation to FIG. 2A, a measured voltage waveform may include a voltage pulse portion 242 and a rest portion 243. Based on the measured voltage waveform and the characteristic voltages therein, a relative diffusion coefficient, $D_{Li+,\ rel}$, may be calculated or otherwise determined.

Based at least on the characteristic voltages and/or the determined relative diffusion coefficient, the controller 130 may determine a charge waveform. For example, the controller 130 may determine the charge waveform by comparing the determined relative diffusion coefficient to a look up table. The look up table may include a charge pulse duration, charge pulse current, and rest duration for a range of relative diffusion coefficients. It is understood that the determined charge waveform may include charge pulses that may be similar or different from the characterization pulse. Furthermore, the determined charge waveform may include identical or different charge pulses with respect to pulse duration, pulse current, and rest duration. The charge waveform may then be applied by the charger 120 to charge the battery 110.

In some example embodiments, the controller 130 may adjust the properties of subsequent charge pulses based on one or more characteristic voltages. A number of different characterization voltages may be utilized by the controller 130 in voltage waveform 240. For example, the peak voltages of each pulse may be monitored (e.g. $E_{peak1-4}$, or voltage 247). Alternatively, a "peak to trough" voltage difference may be measured for each pulse (e.g. voltage 246, 250, and 254). Other characteristic voltages are possible.

Figure 2C:
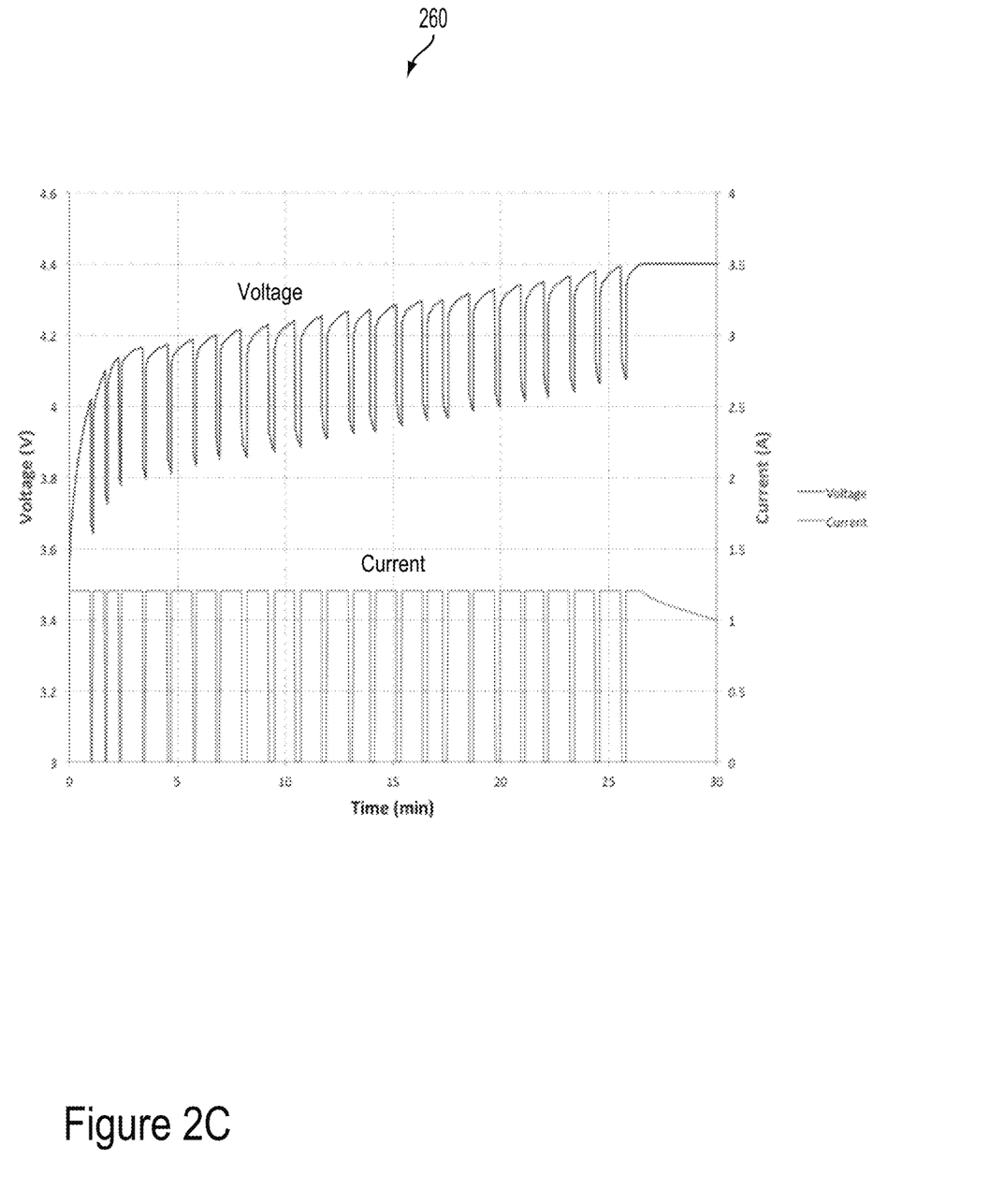
FIG. 2C illustrates current and voltage waveforms, according to an example embodiment.

FIG. 2C illustrates current and voltage waveforms 260 versus time, according to an example embodiment. Specifically, similar to FIGS. 2A and 2B, a series of constant current pulses are applied to a battery and the associated voltage drop across the battery is measured. As the battery is charged, the peaks of the voltage waveform increase up to a threshold voltage (e.g. 4.4 V). It will be understood that different batteries and/or charging processes may have different threshold voltage values.

In response to the peak of the voltage waveform being equal to and/or greater than the threshold voltage (again 4.4V), the controller 130 may enter into a second charging phase. Namely, the controller 130 may switch to a constant voltage charging phase during which a constant voltage (e.g. 4.4V) is applied to the battery.

Figure 2D:
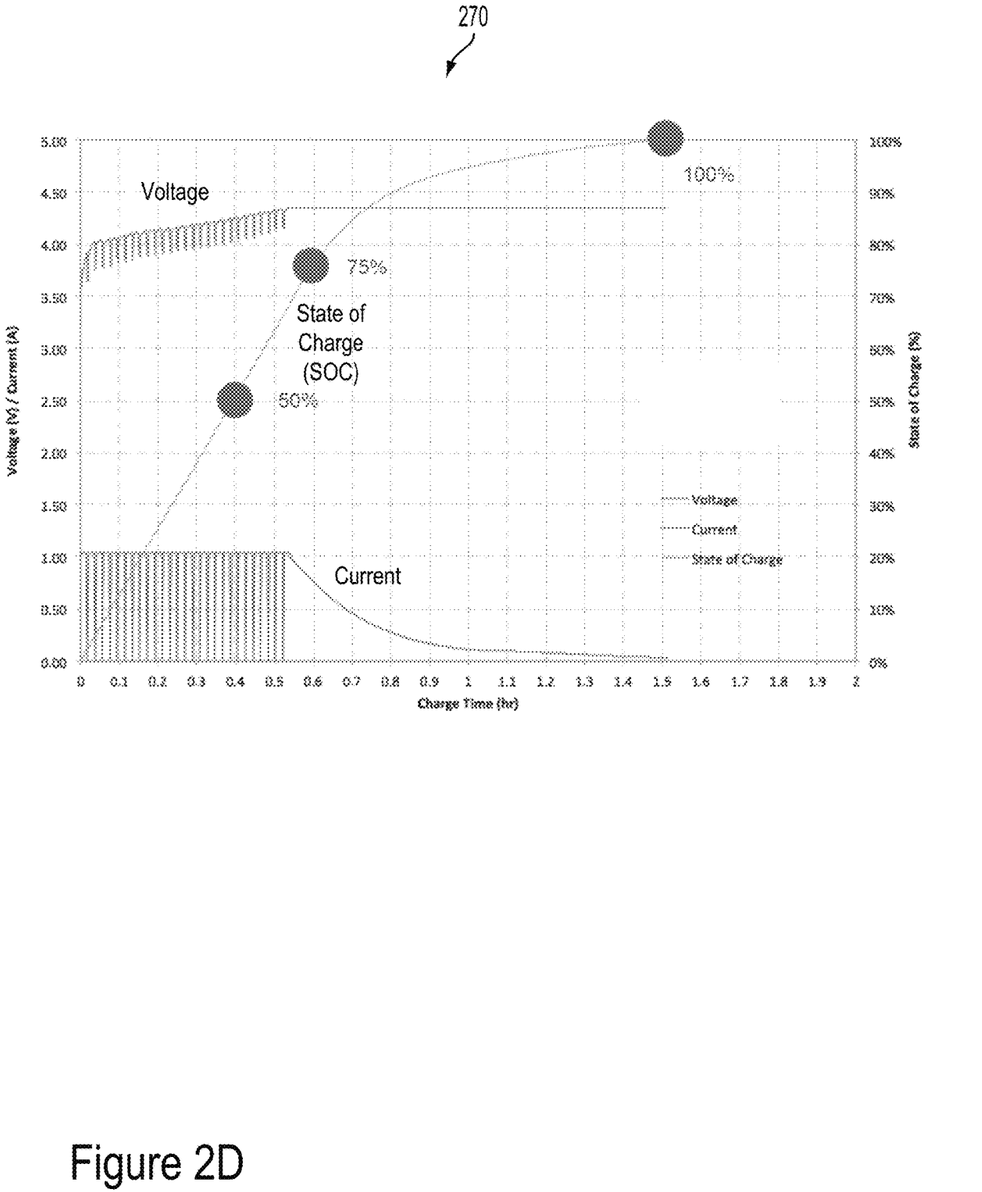
FIG. 2D illustrates current, voltage, and state of charge waveforms, according to an example embodiment.

FIG. 2D illustrates current, voltage, and state of charge waveforms 270, according to an example embodiment. Again, a plurality of constant current charge pulses is applied to the battery. Once reaching a threshold voltage, the charging process switches to a constant voltage charge phase. FIG. 2D illustrates the state of charge increasing monotonically as charge pulses are applied to the battery and leveling off and approaching 100% SOC as a constant voltage is applied.

Figure 2E:
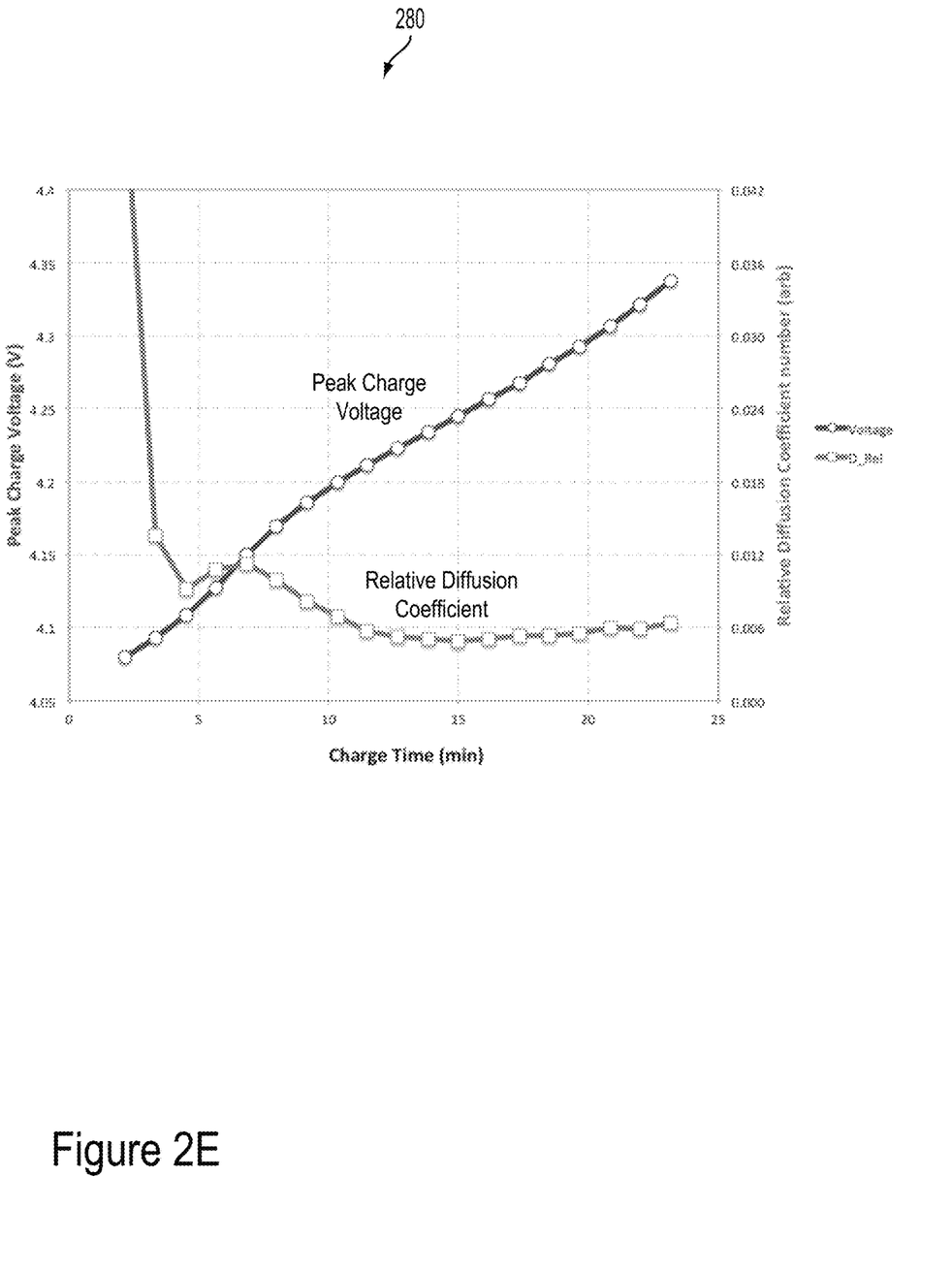
FIG. 2E illustrates peak charge voltage and relative diffusion coefficient waveforms, according to an example embodiment.

FIG. 2E illustrates peak charge voltage and relative diffusion coefficient waveforms 280, according to an example embodiment. Namely, as described above, the peak voltage increases as charge pulses are applied to the battery. Furthermore, the relative diffusion coefficient may be determined based on the formula above or using other estimates. In some cases, the subsequent pulse duration, pulse current, and rest duration may be adjusted based on the relative diffusion coefficient in order to keep such a quantity constant over at least a portion of the charging process. Alternatively, the pulses may be adjusted so as to maintain the relative diffusion coefficient along a predetermined coefficient versus charge time curve.

III. Example Methods

Figure 3:
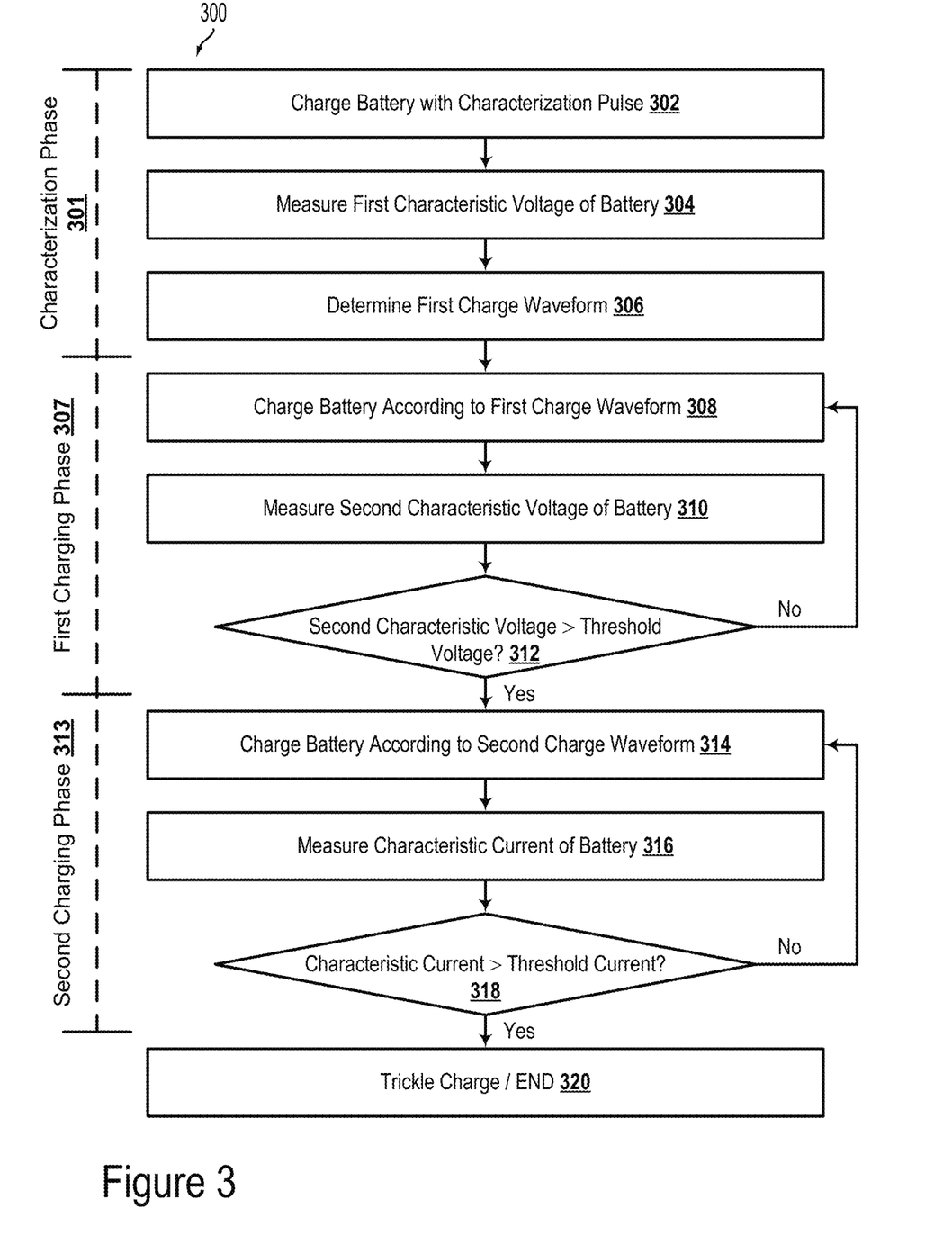
FIG. 3 illustrates a flowchart of a battery charging process, according to an example embodiment.

FIG. 3 illustrates a flowchart of a battery charging process 300, according to an example embodiment. The battery charging process 300 may be carried out with system 100 as illustrated and described in relation to FIG. 1. Furthermore, the battery charging process 300 may be similar or identical to processes and methods described elsewhere herein, such as with respect to FIGS. 2A-2E and FIG. 4. For example, during an initial characterization phase 301, a battery (such as battery 110) may be charged with a characterization pulse (Block 302). The characterization pulse may be a predetermined constant current pulse and/or a constant voltage pulse.

A first characteristic voltage of the battery may be measured (Block 304). The first characteristic voltage may be a peak voltage, a voltage difference from "peak-to-trough" of the voltage pulse, or another voltage. Alternatively, in the scenario where a constant voltage characterization pulse is used, a characteristic current may be measured.

Based at least one the first characteristic voltage, a first charge waveform may be determined (Block 306). In an example embodiment, the first charge waveform may include a plurality of charge pulses and rests. The charge pulses and rests may be determined based on a known or predicted diffusion rate of lithium ions in the battery. Alternatively or additionally, the first charge waveform may be determined based on maintaining a predetermined temperature or staying below a predetermined temperature rate of change. Other considerations in determining the first charge waveform are possible.

For example, the first characteristic voltage may be compared to a look-up table so as to determine a matching entry. The look-up table may include a plurality of entries. Each entry of the plurality of entries may include a respective voltage, a respective pulse duration, a respective pulse current, and a respective rest duration. In such a scenario, determining the matching entry includes determining that the first characteristic voltage is substantially equal to the respective voltage of the matching entry. When such a determination is made, the process may include setting the first charge waveform in accordance with the respective pulse duration, the respective pulse current, and the respective rest duration of the matching entry.

During a first charging phase 307, a battery charger device (e.g. charger 120) may charge the battery according to the first charge waveform (Block 308). That is, the plurality of charge pulses and rests of the first charge waveform may be delivered to the battery so as to charge it.

Also during the first charging phase 307, a second characteristic voltage may be measured (Block 310). The second characteristic voltage may be measured in a manner similar or different than that of the first characteristic voltage. That is, the second characteristic voltage may include a peak voltage, a voltage difference from "peak-to-trough" of the voltage pulse, or another voltage. In an example embodiment, the second characteristic voltage may be measured in an effort to obtain information indicative of the battery reaching a "full charge" state. That is, the second characteristic voltage may measure the state of charge of the battery and/or a diffusion rate of the lithium ions in the battery. The second characteristic voltage may be measured periodically (each millisecond, second, minute, etc) or at one or more predetermined times.

Block 312 compares the second characteristic voltage to a threshold voltage. If the second characteristic voltage is not greater than a threshold voltage, the process may return to Block 308. If the second characteristic voltage is greater than the threshold voltage, the process may enter a second charging phase 313.

During the second charging phase 313, the battery is charged according to a second charge waveform (Block 314). As described above, the second charge waveform may include a static or pulsed constant voltage waveform. Also during the second charging phase 313, a characteristic current of the battery is measured (Block 316).

Block 318 includes comparing the characteristic current with a threshold current. If the characteristic current is not greater than the threshold current, the process may revert to Block 314. If the characteristic current is greater than the threshold current, the process may end or change to a trickle or float charging phase (Block 320).

Figure 4:
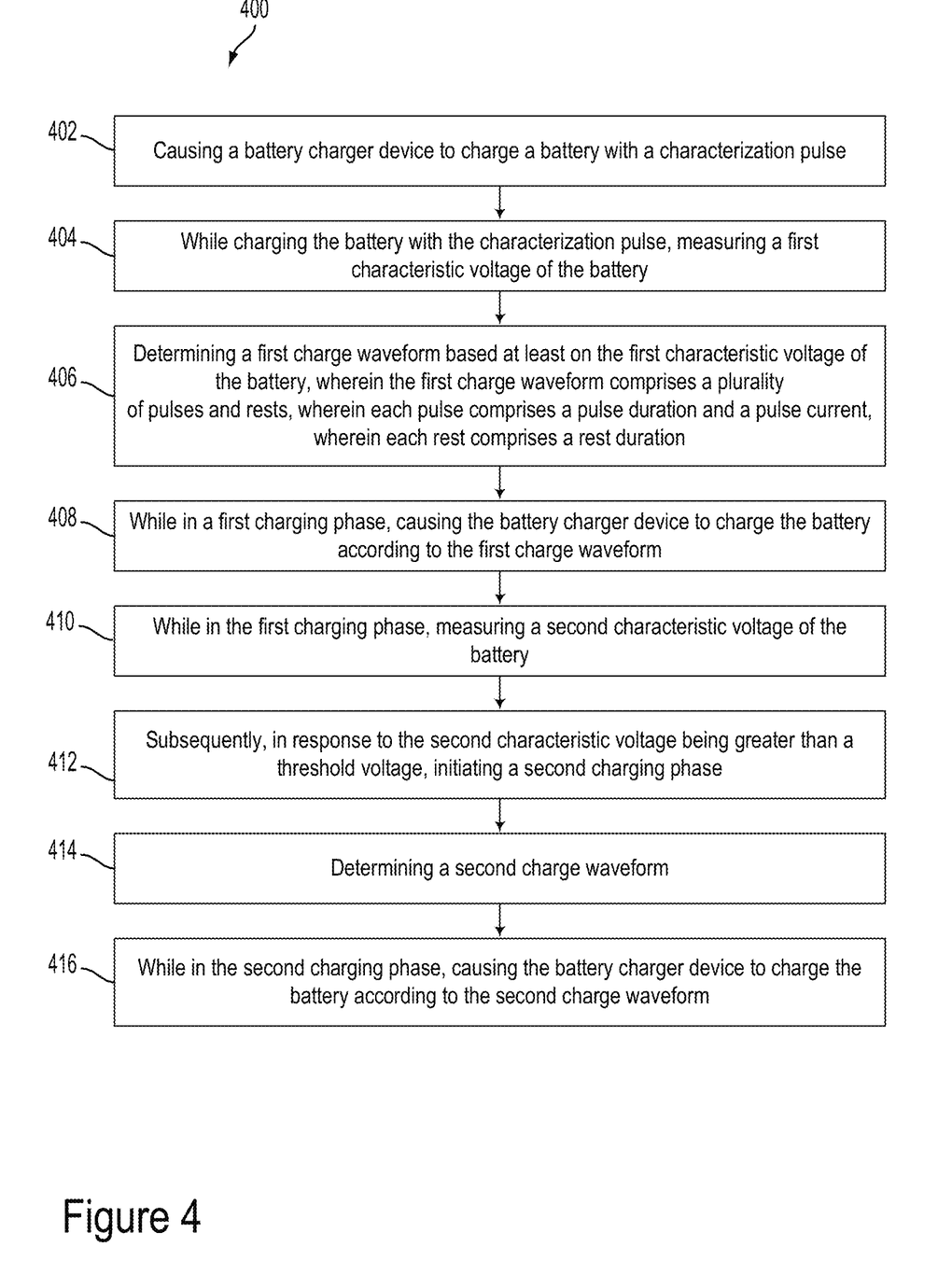
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted or added to method 400. The blocks of method 400 may be carried out to with some or all of the elements of the system 100 as illustrated and described in reference to FIG. 1.

Block 402 includes causing a battery charger device to charge a battery with a characterization pulse. The characterization pulse may be similar or identical to characterization pulse 200 as illustrated and described in relation to FIG. 2A. Block 404 includes while charging the battery with the characterization pulse, measuring a first characteristic voltage of the battery. The first characteristic voltage may be a voltage signal indicative of a diffusion rate of lithium ions in the battery.

Block 406 includes determining a first charge waveform based at least on the first characteristic voltage of the battery. The first charge waveform includes a plurality of pulses and rests as described elsewhere herein. Each pulse includes a pulse duration and a pulse current and each rest includes a rest duration. The pulse duration, pulse current, and rest durations of the plurality of pulses and rests of the first charge waveform may be determined based on the first characteristic voltage (and the corresponding diffusion rate of ions in the battery).

Block 408 includes, while in a first charging phase, causing the battery charger device to charge the battery according to the first charge waveform. At least a portion of the first charge waveform may be similar to that illustrated and described with respect to FIG. 2B. Furthermore, Block 410 includes, while in the first charging phase, measuring a second characteristic voltage of the battery. The second characteristic voltage of the battery may include a peak voltage, a peak-to-trough voltage, or another voltage.

Block 412 includes, subsequently, in response to the second characteristic voltage being greater than a threshold voltage, initiating a second charging phase. That is, in some embodiments, if the second characteristic voltage indicates that the battery is becoming fully charged, a constant voltage phase may be initiated. Block 414 includes determining a second charge waveform. In the above scenario, the second charge waveform may include a constant voltage waveform. Block 416 includes, while in the second charging phase, causing the battery charger device to charge the battery according to the second charge waveform.

Figure 5:
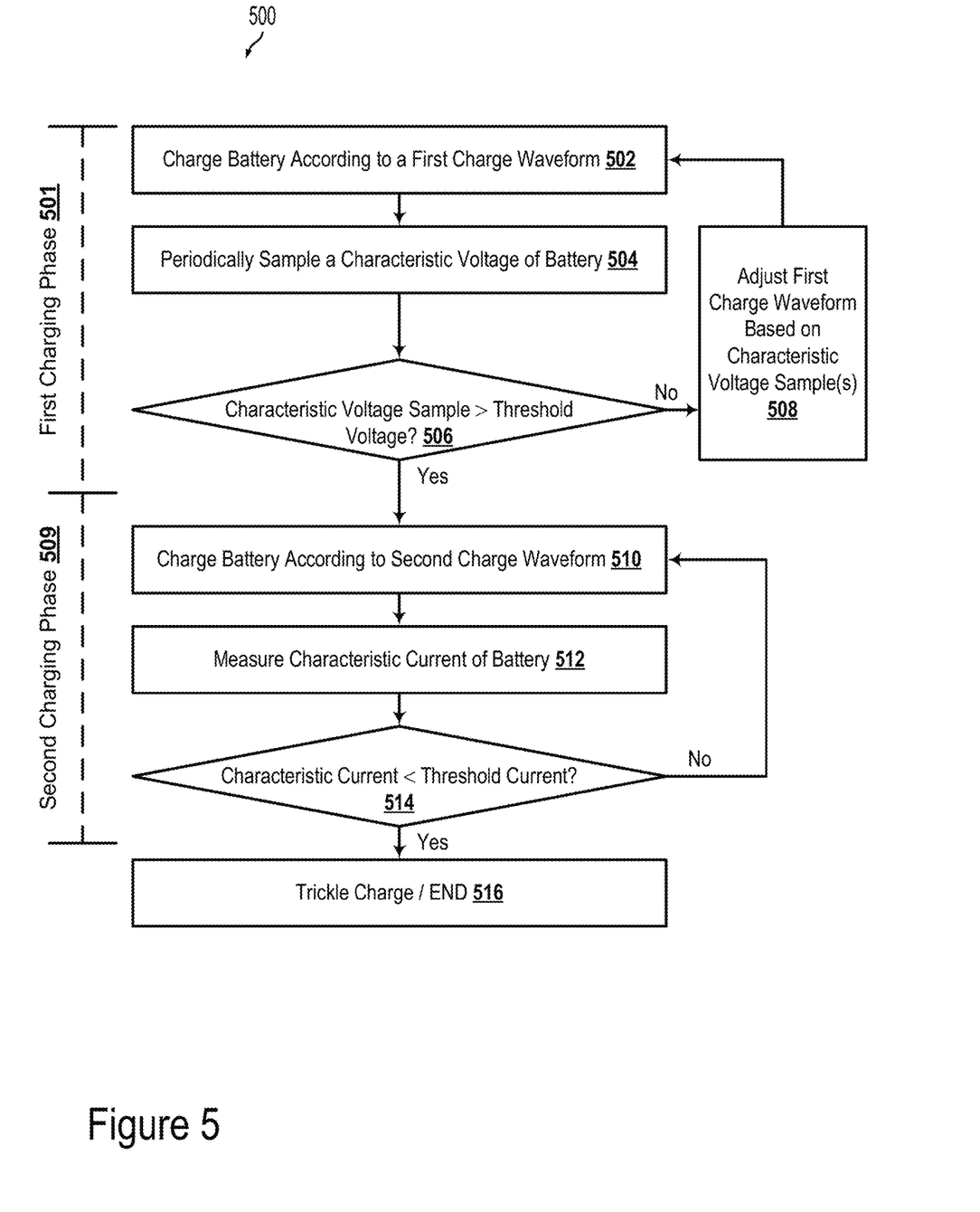
FIG. 5 illustrates a flowchart of a battery charging process, according to an example embodiment.

FIG. 5 illustrates a flowchart of a battery charging process 500, according to an example embodiment. The battery charging process 500 may be carried out with system 100 as illustrated and described in relation to FIG. 1. Furthermore, the battery charging process 500 may be similar or identical to other processes and methods described elsewhere herein, such as with respect to FIGS. 2A-2E and FIG. 6.

In an example embodiment, the battery charging process 500 may be separated into a first charging phase 501 and a second charging phase 509. During the first charge phase 501, a controller (such as controller 130) and a charger (such as charger 120) may charge a battery (e.g. battery 110) according to a first charge waveform (Block 502). The first charge waveform may include a plurality of pulses and rests. The pulses may be constant current pulses.

Block 504 includes periodically sampling a characteristic voltage of the battery. As described elsewhere herein, the characteristic voltage may include a peak voltage of the voltage waveform and/or another voltage. Alternatively or additionally, the characteristic voltage may include information indicative of a diffusion rate of lithium ions in the battery. For example, the characteristic voltage samples may include $dE_s$ and/or $dE_r$, as described with respect to FIG. 2A. Other characteristic voltages are possible.

Block 506 includes comparing at least one characteristic voltage sample with a threshold voltage, such as illustrated and described with respect to FIG. 2C. If the characteristic voltage sample is not greater than the threshold voltage, the first charge waveform may be adjusted based on the at least one characteristic voltage samples. As an example, a pulse duration, a pulse current, and/or a rest duration may be adjusted based on the characteristic voltage samples. In some embodiments, the respective rest duration may be adjusted such that the sampled characteristic voltage or voltage difference remains substantially similar while in at least the first charging phase.

If the characteristic voltage sample is greater than the threshold voltage, the charging process may enter the second charging phase 509. For instance, the charger 120 and controller 130 may charge the battery 110 according to a second charge waveform (Block 510). In an example embodiment, the second charge waveform may include a constant voltage waveform.

A characteristic current of the battery may be measured (Block 512). Block 514 may include comparing the characteristic current to a threshold current. That is, if the characteristic current drops below the threshold current, the battery may be at a full capacity and battery charging may end or proceed to a float or trickle charging process (Block 516). If the characteristic current is not less than the threshold current, the process may return to Block 510.

Figure 6:
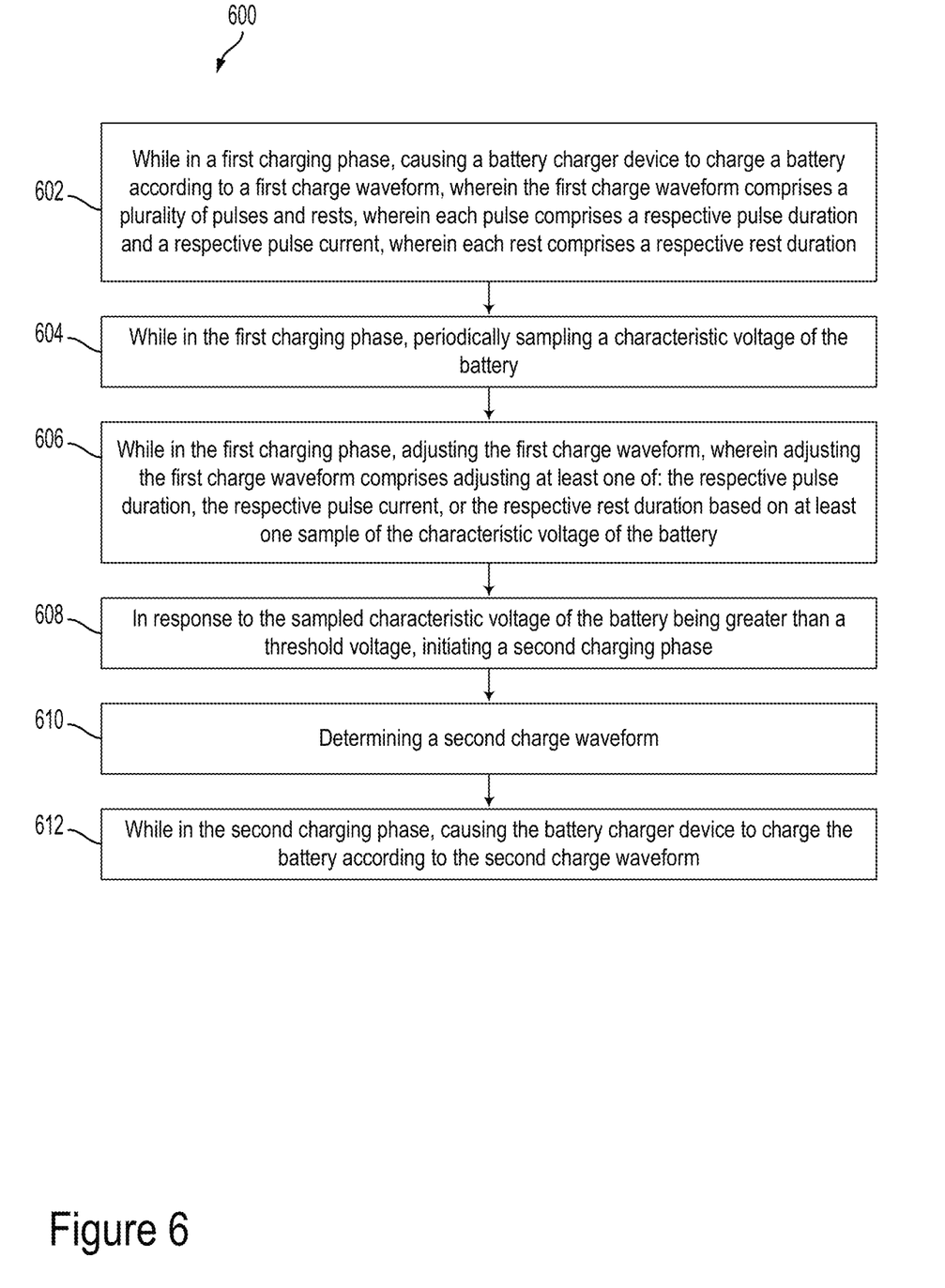
FIG. 6 illustrates a method, according to an example embodiment.

FIG. 6 illustrates a method 600, according to an example embodiment. The method 600 may include various blocks or steps. The blocks or steps may be carried out individually or in combination. The blocks or steps may be carried out in any order and/or in series or in parallel. Further, blocks or steps may be omitted or added to method 600. The blocks of method 600 may be carried out to with some or all of the elements of the system 100 as illustrated and described in reference to FIG. 1.

Block 602 includes, while in a first charging phase, causing a battery charger device to charge a battery according to a first charge waveform. For example, the first charge waveform may include a plurality of pulses and rests. Each pulse includes a respective pulse duration and a respective pulse current and each rest includes a respective rest duration.

As an example, the pulse duration may be 60 seconds, the pulse current may be 1.5×C, and the rest duration may be 10 seconds, wherein C comprises a charge rate equal to charging the battery from an empty charge state to a full charge state in one hour. It is understood that other pulse durations, pulse currents, and rest durations are possible. Furthermore, such attributes of the charge waveform may remain static or may change dynamically throughout the charging process.

Block 604 includes, while in the first charging phase, periodically sampling a characteristic voltage of the battery. As described elsewhere herein, the characteristic voltage may represent a variety of voltages related to the battery. In an example embodiment, the characteristic voltage includes a voltage difference between a terminal voltage of the battery during at least one pulse and a terminal voltage of the battery during at least one rest.

Block 606 includes, while in the first charging phase, adjusting the first charge waveform. Adjusting the first charge waveform includes adjusting at least one of: the respective pulse duration, the respective pulse current, or the respective rest duration based on at least one sample of the characteristic voltage of the battery.

Adjusting the first charge waveform may further include comparing the first charge waveform with a plurality of entries in a look-up table. The look-up table may include entries that may each have a respective voltage, a respective pulse duration, a respective pulse current, and a respective rest duration. A matching entry may be determined if the characteristic voltage of the battery is substantially equal (e.g. within 1 mV, within 10 mV, or within half of the voltage difference between adjacent entries in the look-up table) of the respective voltage of the matching entry. The method may optionally include adjusting the respective pulse duration, the respective pulse current, and the respective rest duration of the first charge waveform according to the matching entry. In some embodiments, adjusting the first charge waveform may include adjusting the respective rest duration such that the voltage difference remains substantially similar while in at least the first charging phase.

Block 608 includes, in response to the sampled characteristic voltage of the battery being greater than a threshold voltage, initiating a second charging phase. Block 610 includes determining a second charge waveform. The second charge waveform may include a constant voltage. Block 612 includes, while in the second charging phase, causing the battery charger device to charge the battery according to the second charge waveform.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a battery;
   a battery charger device configured to controllably provide an electrical current to the battery; and
   a controller configured to:
      while in a first charging phase, initially cause the battery charger device to charge the battery according to a first charge waveform, wherein the first charge waveform comprises a plurality of pulses and rests, wherein each pulse comprises a respective peak terminal voltage, a respective pulse duration, and a respective pulse current, wherein each rest comprises a respective minimum terminal voltage and a respective rest duration, wherein the respective peak terminal voltages increase during the first charging phase;
      while in the first charging phase, periodically sample a characteristic voltage of the battery;
      while in the first charging phase receive information indicative of a voltage difference, wherein the voltage difference comprises a peak to trough difference between the peak terminal voltage during a respective pulse and the minimum terminal voltage during a neighboring rest;
      while in the first charging phase, adjust at least one rest duration, based on the voltage difference, such that subsequent voltage differences remain substantially similar while in the first charging phase;
      subsequently, in response to the sampled characteristic voltage of the battery being greater than a threshold voltage, initiate a second charging phase;
      determine a second charge waveform;
      while in the second charging phase, cause the battery charger device to charge the battery according to the second charge waveform.

2. The system of claim 1, wherein the battery charger device is further configured to controllably provide constant DC current to the battery.

3. The system of claim 1, wherein the battery charger device is further configured to controllably provide pulsed DC current to the battery.

4. The system of claim 1, wherein the second charge waveform comprises a constant voltage.

5. The system of claim 1, wherein the battery comprises an anode and a cathode, wherein the anode comprises graphite, and wherein the cathode comprises lithium cobalt oxide ($LiCoO_2$).

6. The system of claim 1, wherein the pulse duration comprises 60 seconds, the pulse current comprises 1.5×C, and the rest duration comprises 10 seconds, wherein C comprises a charge rate equal to charging the battery from an empty charge state to a full charge state in one hour.

7. A method comprising:
   causing a battery charger device to charge a battery with a characterization pulse;
   while charging the battery with the characterization pulse, measuring a first characteristic voltage of the battery;
   determining a first charge waveform for a first charging phase based at least on the first characteristic voltage of the battery, wherein the first charge waveform comprises a plurality of pulses and rests, wherein each pulse comprises a respective peak terminal voltage, a respective pulse duration, and a respective pulse current, wherein each rest comprises a respective minimum terminal voltage and a respective rest duration, wherein the respective peak terminal voltages increase during the first charging phase;
   while in the first charging phase, causing the battery charger device to charge the battery according to the first charge waveform;
   while in the first charging phase, measuring a second characteristic voltage of the battery;
   while in the first charging phase receiving information indicative of a voltage difference, wherein the voltage difference comprises a peak to trough difference between the peak terminal voltage during a respective pulse and the minimum terminal voltage during a neighboring rest;
   while in the first charging phase, adjusting at least one rest duration, based on the voltage difference, such that subsequent voltage differences remain substantially similar while in the first charging phase;
   subsequently, in response to the second characteristic voltage being greater than a threshold voltage, initiating a second charging phase;
   determining a second charge waveform; and
   while in the second charging phase, causing the battery charger device to charge the battery according to the second charge waveform.

8. The method of claim 7, wherein the second charge waveform comprises a constant voltage.

9. The method of claim 7, wherein the pulse duration comprises 60 seconds, the pulse current comprises 1.5×C, and the rest duration comprises 10 seconds, wherein C comprises a charge rate equal to charging the battery from an empty charge state to a full charge state in one hour.

10. The method of claim 7, wherein determining the first charge waveform comprises:
   determining a matching entry from a look-up table, wherein the look-up table comprises a plurality of entries, wherein each entry of the plurality of entries comprises a respective voltage, a respective pulse duration, a respective pulse current, and a respective rest duration, wherein determining the matching entry comprises determining that the first characteristic voltage is substantially equal to the respective voltage of the matching entry; and
   setting the first charge waveform to the respective pulse duration, the respective pulse current, and the respective rest duration of the matching entry.

11. A method comprising:
   while in a first charging phase, causing a battery charger device to charge a battery according to a first charge waveform, wherein the first charge waveform comprises a plurality of pulses and rests, wherein each pulse comprises a respective peak terminal voltage, a respective pulse duration, and a respective pulse current, wherein each rest comprises a respective minimum terminal voltage and a respective rest duration, wherein the respective peak terminal voltages increase during the first charging phase;
   while in the first charging phase, periodically sampling a characteristic voltage of the battery;
   while in the first charging phase receiving information indicative of a voltage difference, wherein the voltage difference comprises a peak to trough difference between the peak terminal voltage during a respective pulse and the minimum terminal voltage during a neighboring rest;
   while in the first charging phase, adjusting the first charge waveform, wherein adjusting the first charge waveform comprises adjusting at least one rest duration, based on the voltage difference, such that subsequent voltage differences remain substantially similar while in the first charging phase;
   in response to the sampled characteristic voltage of the battery being greater than a threshold voltage, initiating a second charging phase;
   determining a second charge waveform;
   while in the second charging phase, causing the battery charger device to charge the battery according to the second charge waveform.

12. The method of claim 11, wherein the second charge waveform comprises a constant voltage.

13. The method of claim 11, wherein adjusting the first charge waveform further comprises:
   determining a matching entry from a look-up table, wherein the look-up table comprises a plurality of entries, wherein each entry of the plurality of entries comprises a respective voltage, a respective pulse duration, a respective pulse current, and a respective rest duration, wherein determining the matching entry comprises determining that the characteristic voltage is substantially equal to the respective voltage of the matching entry; and
   adjusting the respective pulse duration, the respective pulse current, and the respective rest duration of the first charge waveform according to the matching entry.

14. The method of claim 11, wherein the pulse duration comprises 60 seconds, the pulse current comprises 1.5×C, and the rest duration comprises 10 seconds, wherein C comprises a charge rate equal to charging the battery from an empty charge state to a full charge state in one hour.

* * * * *